United States Patent
Svoronos

[15] 3,647,372

[45] Mar. 7, 1972

[54] METHOD OF RECOVERING ALUMINA FROM ALUNITE AND ALUMINOSILICATE MATERIALS

[72] Inventor: Jason Svoronos, Athens, Greece

[73] Assignee: Eleusis Bauxite Mines Mining Industrial & Shipping Inc., Athens, Greece

[22] Filed: July 13, 1970

[21] Appl. No.: 56,200

Related U.S. Application Data

[63] Continuation of Ser. No. 823,499, May 9, 1969, which is a continuation-in-part of Ser. No. 704,952, Feb. 12, 1968, abandoned, which is a continuation-part of Ser. No. 242,061, Dec. 5, 1962, abandoned.

[52] U.S. Cl. ...................................23/142, 23/52, 23/121, 23/154
[51] Int. Cl. ....................C01f 7/02, C01f 7/04, C01d 5/00
[58] Field of Search ..............................23/142, 52, 121, 154

[56] References Cited

UNITED STATES PATENTS

| | | | |
|---|---|---|---|
| 1,301,394 | 4/1919 | Cross | 23/142 |
| 1,041,598 | 10/1912 | Cowles | 23/142 X |
| 1,191,105 | 7/1916 | Hershman | 23/142 X |
| 1,253,591 | 1/1918 | Hagedorn | 23/142 |
| 1,268,433 | 6/1918 | Chappell | 23/142 X |
| 1,338,428 | 4/1920 | Downs | 23/141 |

*Primary Examiner*—Edward Stern
*Attorney*—Watson, Cole, Grindle & Watson

[57] ABSTRACT

A method for extracting pure alumina from alunite and aluminosilicate ores having a high-$SO_3$ content wherein a mixture of at least two alkali chlorides is added to the ore and the combined ore and alkali chlorides is heated to a temperature between 500° and 590° C.

4 Claims, No Drawings

METHOD OF RECOVERING ALUMINA FROM ALUNITE AND ALUMINOSILICATE MATERIALS

This application is a continuation of copending application Ser. No. 823,499, filed May 9, 1969, now abandoned, and a continuation-in-part of my copending application Ser. No. 704,952 filed Feb. 12, 1968, now abandoned, which is a continuation of my copending application Ser. No. 242,061 filed Dec. 5, 1962, now abandoned.

This invention relates to a method for recovering alumina from naturally occurring alunite and aluminosilicate ores which frequently have a high content of sulphur trioxide making recovery of alumina difficult. The present method is equally applicable to both alunite and aluminosilicate materials; however, for the sake of simplicity, the specification will refer primarily to alunite.

Many methods have been devised for the extraction of alumina from alunite and though some methods are capable of producing reasonably pure alumina, these methods have been costly while the cheaper methods have not produced pure alumina. The primary difficulty with previous methods for obtaining pure alumina has been the fact that the alunite ore contains a high percentage of $SO_3$ forming an impurity in the alumina. Normally, the alumina is extracted by dissolving it in sodium hydroxide or potassium hydroxide, but any $So_3$ present reacts with a proportionate quantity of the alkali forming $Na_2SO_4$ as an impurity in the extracted alumina, the $So_3$ and the proportionate amount of NaOH being made useless. Other impurities in the alunite such as iron are insoluble in the alkali and thus may be filtered off from the solution.

One commonly known method for removing the $SO_3$ contained in the alunite is by calcining the alunite at about 800° C. at which temperature it decomposes according to the following reaction:

I. 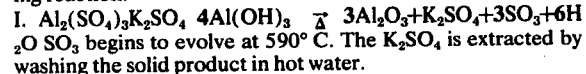

$_2O$ $SO_3$ begins to evolve at 590° C. The $K_2SO_4$ is extracted by washing the solid product in hot water.

Though this method does free the alunite of $SO_3$, other impurities contained in the alunite ore are made extremely difficult to extract because of the high temperature used. $Fe_2O_3$ and $SiO_2$ for example are not removed during calcination. Also at temperatures above 700° C, alumina crystallizes and becomes nearly insoluble in the caustic alkalis. When successfully dissolved in alkalis, the alumina is usually found to be impure because of the simultaneous dissolution of the $SiO_2$.

Another known method for extracting $So_3$ from alumina ore involves calcining alunite mixed with sodium chloride or potassium chloride. The following reactions occur:

II. 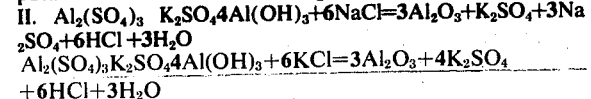

These reactions are promoted by subjecting the mixtures to superheated vapors. The HCl and $H_2O$ are driven off during the heating and the $Na_2SO_4$ and $K_2SO_4$ as well as any excess NaCl or KCl are extracted by washing with water. Though the resulting alumina is free of $SO_3$ is still contains other impurities from the alunite ore.

The reactions set forth are described for example in U.S. Pat. Nos. 744,765; 1,040,893; 1,914,999; 1,240,570; 1,301,394; and 2,058,145. In none of these patented methods is there described a second stage, the treatment of the $So_3$-free material with NaOH as one might have expected. Instead, various other and more difficult and costly processes are described. This is explained by the fact that those who developed the patented methods considered it indispensable to carry out the No. II reaction at 700° C. and above, where, as previously pointed out, the highly calcined alumina becomes more difficult to dissolve in NaOH and when dissolution is accomplished it is more costly and produces an inferior alumina product since $SiO_2$ is also dissolved. Since it was impractical to dissolve the product the patents called for calcining as a second stage of treatment, wherein the product is first mixed with $Na_2SO_4$ or with a mixture of $Na_2SO_4$ and carbon, the calcining being carried out at temperature ranging between 1,200° and 1,400° C. $SO_3$ or $SO_2$ is evolved at these temperatures and sodium aluminate is formed, but this is done at relatively high cost because of the high temperatures required and the alumina product is contaminated because of the simultaneous formation of $Na_2Si_2O_7$.

At the time the prior art methods were developed they were for the most part satisfactory, since alumina demanded a high price and requirements for purity were not great. This is not the case in the present day as cheaper and purer products are required.

It is an object of this invention to recover pure alumina from alunite and aluminosilicate materials at low cost.

A further object is to recover alumina in accordance with reaction No. II but at temperatures much lower than 700° C.

A still further object of the invention is a method of recovering alumina according to reaction No. II in which crystallization of $Al_2O_3$ is avoided, thus resulting in a purer alumina product without the presence of $SiO_2$.

Basically, the present invention comprises carrying out the above reaction No. II with a mixture within a certain relative concentration range of alkali chlorides at a considerably lower temperature than is possible with only one alkali The product produced thereby is first washed with water to remove $Na_2SO_4$ and $K_2SO_4$ as well as any remaining alkali chloride after which the extracted product is dissolved in sodium hydroxide to produce pure alumina.

It has been discovered that the rate of reaction No. II is proportional to the temperature of the reaction. Reaction begins at about 500° C. with an increasing rate of reaction up to about 590° C. At higher temperatures the alunite which has not reacted decomposes by calcination and $SO_3$ evolves. What has happened is that at temperatures higher than 590° C. not only is reaction No. II occurring but also reaction No. I is occurring concurrently yielding $SO_3$. The problem, therefore, is to maintain the reaction mixture at a substantially lower than normal temperature but at the same time force the reaction to completion in order that all of the alunite will be reacted.

It has been discovered that if a mixture of sodium and potassium chlorides is added to the alunite ore, reaction No. II may be caused to go to completion within the lower temperature range. The relative proportions of NaCl and KCl, however, must be carefully controlled. One of the alkali chlorides must be a major constituent of the mixture ranging between 90 and 95 percent thereof, and the other alkali chloride is the minor constituent of the mixture ranging between 5 and 10 percent by weight. Thus, if KCl is the major constituent of the alkali chloride mixture, then the NaCl will range between 5 and 10 percent of the mixture. Percentages greater than 10 percent for the minor constituent must be avoided so as not to hinder the subsequent crystallization of $K_2SO_4$ from the leach solution.

In conducting the reaction according to the present invention, the alunite ore is preferably ground to a fineness ranging between −40 and −100 mesh and the mixture of KCl and NaCl is also ground to a fineness ranging between −10 and −20 mesh. The alunite ore and alkali metal chloride are mixed together and a slight amount of moisture is then added after which the moistened mixture is formed into small balls as is known in the industry. The balling step is conducted to avoid dust and to achieve better heat transfer in the rotary kiln.

The alkali chloride mixture is then added to the alunite. Preferably, an excess of at least 10 percent by weight of the alkali chlorides is added to the alunite to avoid any eventual localized lack of alkali chlorides or unforeseen variations in the alunite composition. This percentage is based on the theoretical amount of alkali chlorides required to carry out reaction No. II which is, of course, calculated based on the alumina content of the alunite ore.

The mixture of alunite ore and alkali chlorides is then introduced into a rotary kiln where the temperature is maintained in no case above 590° C. in order that reaction No. II will occur and reaction No. I will be avoided. Preferably, the temperature should range between 550° and 580° C. All of the $SO_3$ contained in the alunite will be converted to $K_2SO_4$ without traces of it being evolved to degrade the simultaneously evolving HCl which itself is also marketable.

Preferably, super-heated water vapor is passed over the heated mixture, since at the lower operating temperatures used according to the present invention the moisture content of the alunite may be driven off before completion of the reaction leaving no source of hydrogen for further formation of HCl. The superheated water vapor may serve to supplement water added to the alunite before heating.

Under the conditions described above, the reaction rate will be fast enough despite the lower temperature to maintain heating costs at a minimum. Preferably, the reaction rate should be less than 2 hours.

Following the heating step, the small balls coming out of the kiln are immediately dropped while still burning into water where it undergoes a sudden cooling. The alumina is transformed wholly or at least in part to the still more soluble aluminum hydroxide which is easily washed from the soluble salts on the filters at a later stage. Since the solid known as "ink" which is impure aluminum hydrate is amorphous in contrast to the coexisting $SiO_2$ which exists as an impurity and which is crystalline, it is possible after the leaching step and before dissolution in caustic soda to mechanically concentrate the alumina or aluminum hydrate and separate it from the large part of the $SiO_2$. Various known mechanical separation processes may be used, an example of which is the flotation method. The mechanical concentration step is particularly advantageous where poor grade alunite ores are being used. The cost of this step is minimal in view of the fact that no grinding is necessary prior to the mechanical concentration step.

The following are two specific examples of the application of the novel process.

EXAMPLE 1

An alunite ore was used containing the following composition:

| | |
|---|---|
| Alunite | 91% |
| $SiO_2$ | 8% |
| $Fe_2O_3$ | 0.5% |
| Other impurities | 0.5% |

The alunite was ground to a fineness of −60 mesh.

To this was added a mixture of KCl and NaCl. A stoichiometric amount of KCl would be 500 kgs. per ton of alunite, and a 10 percent excess would be 550 kgs. The resultant mixture contained the following relative proportions:

| | |
|---|---|
| Alunite (91% purity) | 1000 kg. |
| KCl (99% purity) | 522 kg. |
| NaCl | 28 kg. |

The KCl-NaCl mixture was ground to a fineness of about −20 mesh prior to being added to the alunite ore. The mixture was thoroughly mixed in a mixer after which a slight amount of moisture was added and the mixture passed through a ball-making machine prior to being introduced into the kiln.

The kiln was heated to a temperature ranging between 550° C. and 580° C, the dimensions and the rate of rotation of the kiln being maintained such that the mixture remained in the kiln for about 2 hours. Superheated water vapor was passed through the rotary kiln in a direction opposite to that of the alunite-alkali chloride mixture. The superheated water vapor mixed with the water vapor and HCl was derived from the alunite-alkali chloride mixture. The gases were absorbed at the other end of the kiln and then cooled resulting in a strong solution of HCl.

The small hot balls passing from the kiln are then leached by continuously dropping them into water and then subjected to a concentration step using the flotation process. A nearly saturated warm solution of potassium sulphate and other salts were conveyed to crystallizers to precipitate potassium sulphate and the remaining mother liquor containing excess KCl and NaCl was used for the formation of alunite balls. The mixture of impure $Al_2O_3$ and $Al(OH)_3$ contained about 79 percent alumina which is sufficiently rich to require no further concentration. The product was dissolved in sodium hydroxide solution while being retained in tanks closed to the atmosphere to avoid absorption of $CO_2$. The product was then filtered to remove various impurities and the clear solution of sodium aluminate was finally decomposed to produce pure aluminum hydroxide.

EXAMPLE 2

The process of Example 1 was repeated using an alunite ore of the following composition:

| | |
|---|---|
| Alunite | 415 kg. |
| $SiO_2$ | 540 kg. |
| $Fe_2O_3$ | 20 kg. |
| Other impurities | 25 kg. |

For each ton of alunite an alkali-chloride mixture consisting of 238 Kgs. of KCl and 12 Kgs. of NaCl ground to a fineness of −100 mesh was added to the ore. The produced alumina after washing contained the following composition:

| | |
|---|---|
| $Al_2O_3$ | 153 kg. |
| $SiO_2$ | 540 kg. |
| $Fe_2O_3$ | 20 kg. |
| Other impurities | 25 kg. |

Since the alumina content was only about 20.7 percent which would be difficult and costly to dissolve in sodium hydroxide, the impure alumina was subjected to mechanical concentration by the flotation method resulting in a concentrate of the following composition:

| | |
|---|---|
| $Al_2O_3$ | 126 kg. |
| $SiO_2$ | 26 kg. |
| $Fe_2O_3$ | 11 kg. |
| Other impurities | 8 kg. |

The concentrate thus contained about 73 percent alumina which is satisfactory for treatment with a sodium hydroxide solution.

I claim:

1. A method for obtaining alumna values from alunite and aluminosilicate ores having a high-$SO_3$ content comprising the steps of:
   a. grinding a charge of said ore to between about - 40 and about - 100 mesh,
   b. adding to said charge a mixture of sodium and potassium chlorides ground to between about - 10 and about - 20 mesh,
      1. said alkali metal chloride mixture containing at least about 90 percent by weight of one of said chlorides and at least about 5 percent by weight of the other said chlorides,
      2. the total amount of said alkali metal chlorides being sufficient to react with all of the alumina in said charge,
   c. maintaining the ore and alkali metal chloride mixture at a temperature between about 500$L$ and about 590$L$ C. in the presence of superheated steam for a time sufficient for:
      1. the conversion of substantially all of the $SO_3$ into alkali metal sulfate,
      2. the formation of alumina readily soluble in sodium hydroxide solution,
      3. the liberation of any combined silica present, and
      4. the expulsion of the HCl and the $H_2O$ formed,
   d. leaching the reaction product with water to remove the soluble salts,
   e. dissolving the alumina in sodium hydroxide solution without exposure to the atmosphere to form a clear solution of sodium aluminate, and
   f. decomposing the sodium aluminate to form $Al(OH)_3$.

2. A method as claimed in claim 1 wherein the free silica is separate from the product of the alkali metal chloride treatment.

3. A method as claimed in claim 1 wherein the amount of alkali metal chloride mixture used is up to 10 percent by weight in excess over the stoichiometric amount required to react with the alumina content of said ore.

4. A method as claimed in claim 1 wherein the mixture of ore and alkali metal chlorides is maintained at to a temperature between 550° and 580° C.

* * * * *